United States Patent [19]
Carlsson et al.

[11] Patent Number: 6,026,291
[45] Date of Patent: Feb. 15, 2000

[54] CELLULAR SYSTEM HAVING PROGRAMMABLE SUBSCRIPTION CAPABILITIES

[75] Inventors: Ove Carlsson; Inger Andersson; John Axelsson, all of Linköping, Sweden

[73] Assignee: Telefonaktiebolaget L M Ericsson, Sweden

[21] Appl. No.: 08/840,123

[22] Filed: Apr. 9, 1997

[51] Int. Cl.[7] .................................................. H04M 11/00
[52] U.S. Cl. ........................ 455/406; 455/405; 455/565; 455/418
[58] Field of Search ................................. 455/406, 409, 455/405, 407, 408, 565, 414, 459, 433, 422, 550, 434, 435, 418, 419

[56] References Cited

U.S. PATENT DOCUMENTS

| | | | |
|---|---|---|---|
| 4,399,330 | 8/1983 | Kuenzel | 179/2 EB |
| 4,593,155 | 6/1986 | Hawkins | 179/2 EA |
| 4,734,928 | 3/1988 | Weiner et al. | 379/59 |
| 4,742,560 | 5/1988 | Arai | 455/33 |
| 4,979,207 | 12/1990 | Baum et al. . | |
| 5,029,233 | 7/1991 | Metroka | 455/11 |
| 5,101,500 | 3/1992 | Marui | 455/33 |
| 5,138,648 | 8/1992 | Palomeque et al. | 379/22 |
| 5,148,472 | 9/1992 | Freese et al. | 379/59 |
| 5,153,906 | 10/1992 | Akiyama | 379/112 |
| 5,206,899 | 4/1993 | Gupta et al. . | |
| 5,212,810 | 5/1993 | Maeda et al. | 455/528 |
| 5,249,302 | 9/1993 | Metroka et al. | 455/11.1 |
| 5,259,018 | 11/1993 | Grimmett et al. | 379/144 |
| 5,287,403 | 2/1994 | Atkins et al. | 379/144 |
| 5,297,189 | 3/1994 | Chabernaud | 379/58 |
| 5,301,223 | 4/1994 | Amadon et al. | 379/58 |
| 5,309,501 | 5/1994 | Kozik et al. | 455/410 |
| 5,325,419 | 6/1994 | Connolly et al. . | |
| 5,329,578 | 7/1994 | Brennan et al. | 455/414 |

(List continued on next page.)

FOREIGN PATENT DOCUMENTS

| | | |
|---|---|---|
| 0 047 524 A1 | 9/1981 | European Pat. Off. . |
| 0 048 868 A1 | 9/1981 | European Pat. Off. . |
| 0 433 465 A1 | 6/1990 | European Pat. Off. . |

OTHER PUBLICATIONS

Eleftheriadis et al. User Profile Identification in Future Mobile Telecommunications System, IEEE Network, Sep./Oct. 1994, pp. 33–39.

Sundborg, "Universal Personnal Telecommunication (UPT) Concept and Standardization", Ericsson Review, No. 4, pp. 140–155, 1993.

Zaid, "Personal Mobility in PCS", IEEE Personal Communications, 4th quarter, No. 4, pp. 12–16, 1994.

J. Sundborg, "Universal Personal Telecommunication (UPT)—Concept and Standardism," *Ericsson Review*, 4 (1994), pp. 140–155.

"CT2 Casts Cloud Over U.S. Pay Phone Market," Truet, *Telephony*, Jul. 9, 1990, p.34.

"Personal Mobility in PCs—Removing the Fixed Association Between Terminal and User," Zaid, *8439 IEEE Personal Communications*, 1 (1994) 4th Quarter, No. 4, New York, NY, US, pp. 12–16.

"User Profile Identification in Future Mobile Telecommunications Systems," Eleftheriadis et al., *IEEE Network*, Sep./Oct. 1994, pp. 33–39.

*Primary Examiner*—Reinhard J. Eisenzopf
*Assistant Examiner*—Duc Nguyen
*Attorney, Agent, or Firm*—Jenkens & Gilchrist, P.C.

[57] ABSTRACT

A subscription record within a telecommunication system is sub-divided into three separate registers, namely, a user, a subscription and a terminal register. The use of three separate registers within the system allows several terminals to be associated with one user, several users to be associated with one terminal, several subscriptions to be associated with one user, and several users to be selectively associated with one subscription. The subscription records include a list of allowed users for each subscription account. Additionally, the subscription records include a schedule that defines allowable usage time for each user. The user records include a schedule which defines what subscription accounts will be charged at specified times during the week.

1 Claim, 8 Drawing Sheets

U.S. PATENT DOCUMENTS

| | | | |
|---|---|---|---|
| 5,371,781 | 12/1994 | Ardon | 379/59 |
| 5,437,053 | 7/1995 | Sawa et al. | 455/33.1 |
| 5,438,615 | 8/1995 | Moen | 379/144 |
| 5,440,620 | 8/1995 | Slusky . | |
| 5,479,481 | 12/1995 | Koivunen | 379/59 |
| 5,561,706 | 10/1996 | Fenner | 455/411 |
| 5,577,100 | 11/1996 | McGregor et al. | 379/58 |
| 5,631,947 | 5/1997 | Wittstein et al. | 379/59 |
| 5,668,862 | 9/1997 | Bannister et al. | 379/201 |
| 5,673,306 | 9/1997 | Amadon et al. | 379/59 |
| 5,765,108 | 7/1992 | Martin et al. | 455/422 |

THE ALLOWED USERS LIST

SUBSCRIPTION=ERICSSON

ALLOWED USERS LIST

| WEEK DAY | START TIME | STOP TIME | USERS |
|---|---|---|---|
| 1–5 | 08.00 | 17.00 | Lisa |
| 1–7 | 00.00 | 24.00 | Adam |

*FIG. 6*

CELLULAR SYSTEM HAVING PROGRAMMABLE SUBSCRIPTION CAPABILITIES

RELATED APPLICATION

This application is related to the commonly-assigned U.S. application Ser. No. 08/585,149 filed on Jan. 10, 1996, the contents of which are incorporated herein by reference.

BACKGROUND OF THE INVENTION

1. Technical Field of the Invention

The present invention relates to a cellular telecommunications system and, in particular, to a system for charging the generated fees to a plurality of separate subscriptions according to a pre-selected schedule.

2. Description of Related Art

Developments and improvements in wireless telecommunications switching systems have allowed wireless subscribers to easily move from one location to another while using telephonic services and subscriber features. For example, an inherent feature of a cellular radio system is that an owner of a cellular telephone subscriber station can move freely within his or her home exchange area and receive or make calls without being connected to a communication line by wires. An enhancement of conventional cellular systems is the interconnection of several different systems into a cellular network which allows "roaming." Roaming permits a user to use the same cellular subscriber station in different regions of the country.

Even though a user can "roam" between telecommunications systems, there is still no complete subscriber, terminal, or subscription mobility. To illustrate, each cellular terminal has a specific subscription account in common systems. The owner of the terminal, therefore, is responsible for the subscription account. More specifically, each directory number within a cellular system is assigned to a particular mobile identification number (MIN), and thus, to a particular subscriber terminal and not to a particular user. All calls made from or to each particular cellular subscriber terminal with its unique MIN are charged to the subscriber account associated with the specified MIN.

Each cellular subscriber must, therefore, physically carry the cellular terminal in order to receive and make telephone calls within the system. Moreover, whether a user receives a personal call or a business call, the owner of the terminal is charged for the call. There is, therefore, no true mobility or independency between a cellular system subscription, a cellular subscriber terminal and a cellular user.

It would be a distinct advantage for a cellular user to select a schedule that defines which subscriber account is charged for which calls.

SUMMARY OF THE INVENTION

The present invention provides user, terminal and subscription mobility within a cellular system by assigning a telephone number to a particular user rather than to a particular subscriber terminal.

The present invention enables calls to or from a particular cellular terminal to be charged to a selected subscription account according to a select schedule and not simply to the subscription account of the terminal owner. More specifically, the selected subscription which is to be charged for a call is determined by the combination of user action (or inaction) and time in relation to a preselected schedule.

In general, subscriptions and subscriber terminals are each identified by separate unique identification codes. The present invention discloses a system which allows a single user to choose between a default subscription account and at least one other account for call charges. This selection may be made by a computer program according to system time. Additionally, the selection may be altered by user action as a call is being made or as a function of switch selection.

In one aspect, the present invention includes a system wherein a home location register (HLR) comprises separate registers or storage means for separately storing user, terminal and subscription information.

In another aspect, the present invention provides multiple subscriptions for use by one user. Accordingly, a user may register as the originating caller on a subscriber terminal and have the cost charged to a particular account. The same user may have the cost charged to an alternate subscriber account according to a select schedule or according to a switch selection.

The present invention provides a method and apparatus for enabling user, subscription and terminal mobility by providing for more than one subscription identification to be stored in a user register and more than one user identification to be stored in a subscription register. The selection between the multiple identifications may be made as a function of a programmed schedule found in each of the user and subscription registers. Additionally, whether the selected subscription is a default subscription or the subscription specified by a specified schedule is selectable on a user terminal in a conventional manner.

BRIEF DESCRIPTION OF THE DRAWINGS

A more complete understanding of the method and apparatus of the present invention may be had by reference to the following detailed description when taken in conjunction with the accompanying drawings wherein:

FIG. 6 is a block diagram illustrating an exemplary subscription record stored within an HLR according to a preferred embodiment of the invention;

DETAILED DESCRIPTION OF A PRESENTLY PREFERRED EXEMPLARY EMBODIMENT

Common wireless communication systems employ a one-to-one mapping between a user, a user terminal, and a subscription account. That is, use of the user terminal results in the subscription account for the user being charged for the call even though the call may be by another or on the behalf of another. Within common communication networks, one storage element is used to define the subscriber. That is, one storage element is used to establish the relationship between the user, the terminal and the account.

System flexibility can be greatly improved by defining a clear distinction between each user, subscription and terminal. As used herein, the term "user" refers to a person who uses telephone services within a cellular telecommunications network. Typically, a user is identified electronically by a code known as a mobile identification number (MIN). Likewise, a subscriber is identified electronically by a code as are the terminals. Implicit in any reference to one of these thus is a reference to the actual codes which relate and identify any one of the three. A typical user may wish to charge his calls to more than one subscription account. For example, calls made for private purposes could be charged to the user's subscription while calls made for the user's business purposes could be charged to the user's business subscription. As is disclosed herein, the present invention allows the typical user to select from different subscriptions for originating calls and for terminating calls under certain conditions. This selection may done by selecting a mode of operation. For example, one mode of operation can include charging calls according to a specified schedule.

The term "subscription" as used herein refers to an agreement between a cellular telephone operator and a person. A user may wish to have more than one subscription without having more than one terminal. For example, a user may require one for personal use and one for business use. Additionally, a user may wish to have multiple subscription accounts assigned to the terminal in a selectable manner. Accordingly, there is a logical and conceptual distinction that exists between the above three elements. By separating the conventional association between the above three elements, the present invention discloses a system where multiple subscriptions can be assigned to or available for use by a single user.

Figure 1:
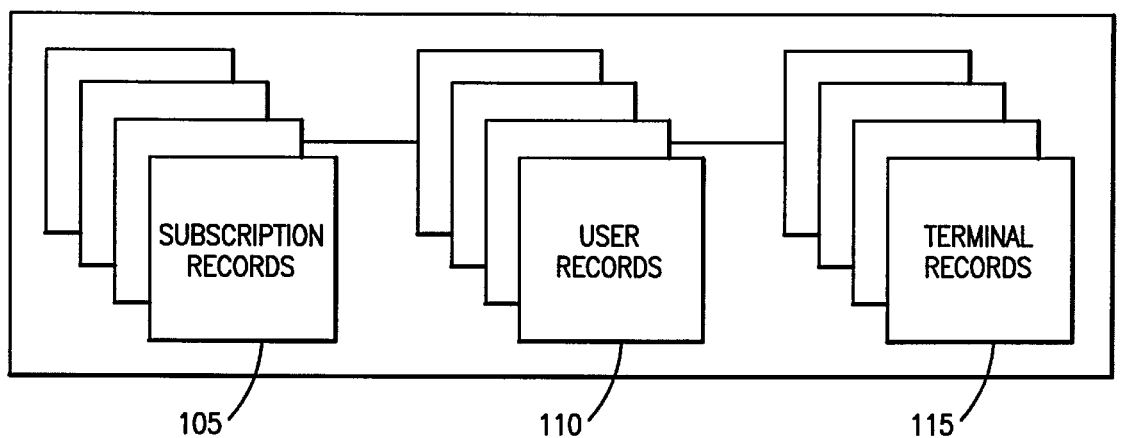
FIG. 1 is a block diagram illustrating independency between subscriptions, users and terminals which may be achieved by maintaining separate records for each in accordance with the teachings of the present invention.

FIG. 1 is a block diagram illustrating independency between subscriptions, users and terminals which may be achieved by maintaining separate records in separate register locations for each one in accordance with the teachings of the present invention. Referring now to FIG. 1, the subscription records 105 store information regarding agreements between users and cellular system operators on the usage of telecommunications services within a telecommunications network. The user records 110 store information regarding persons who have access to telecommunications services within a cellular system. The terminal records 115 store information regarding particular cellular subscriber stations or terminals that are connected to a telecommunications network. Therefore, the terminal records 115 no longer store information regarding subscription or user information. Those data are separately stored in the subscription records 105 and the user records 110. Because there is no fixed association between the above three elements, the number of registers for each one of the above three records does not have to be the same. For example, a single user can be assigned multiple subscriptions and/or multiple terminals.

Figure 2:
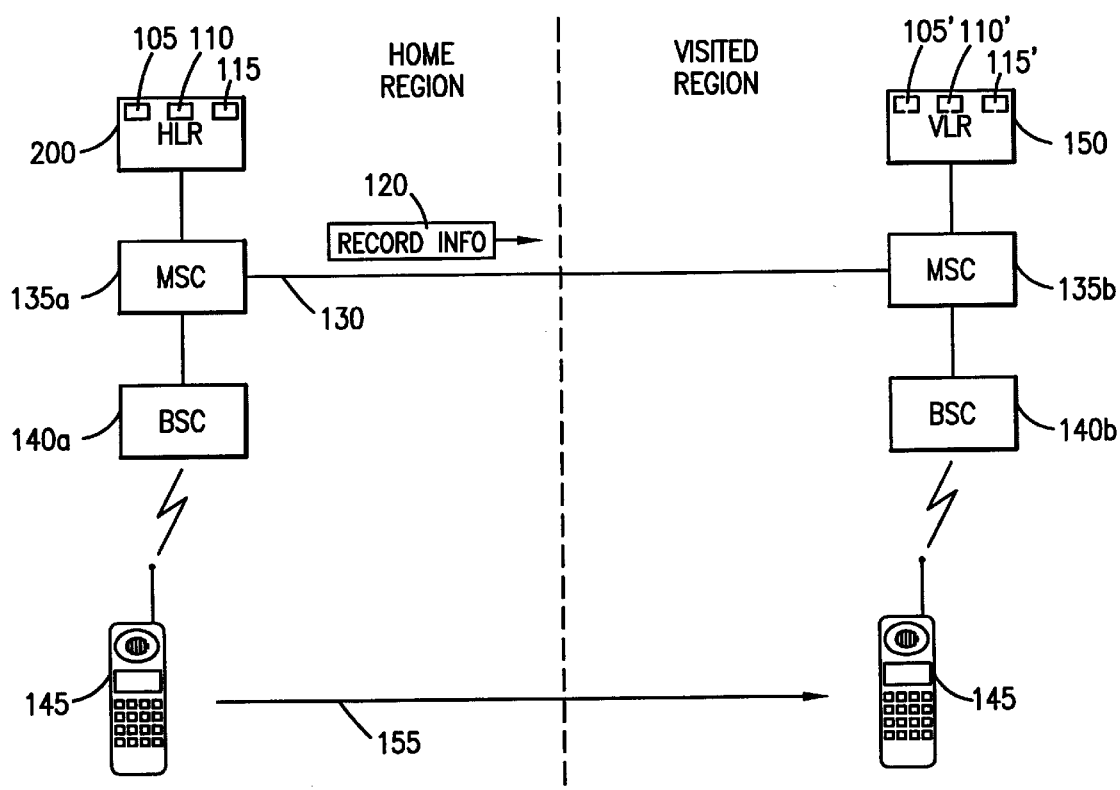
FIG. 2 is a block diagram illustrating functional changes within a cellular radio system according to location.

FIG. 2 is a block diagram showing functional changes within a cellular radio system according to location, which can be used to illustrate the present invention. Referring now to FIG. 2, a cellular telecommunications network link comprises a plurality of mobile service switching centers (MSC) 135a and 135b, a home location register (HLR) 200, a visitor location register (VLR) 150, a plurality of base station controllers (BSC) 140a and 140b, and a cellular telephone terminal 145. The HLR 200 is a data-base containing information about all users, terminals and their services and locations serviced by the MSC 135. In large network networks with high subscriber densities, the HLR 200 is a separate node as shown in FIG. 1. In small networks, it can be integrated into the MSC 135.

The BSC 140a provides the communication link with a cellular telephone terminal 145 when it is within the coverage area of BSC 140a. The MSC 135a, labeled as the "home MSC", is located within a first cellular system and handles the cellular telephone terminal's 145 information. If the subscriber crosses the border to another cellular system serviced by another MSC during a conversation, an interexchange handoff will take place. More specifically, MSC 135a transmits subscription, user and terminal information in a record information signal 120 to MSC 135b. MSC 135b uses known protocols for requesting MSC 135a to transmit such information to accomplish the interexchange handoff.

After receiving record information signal 120, the MSC 135b, handles the conversation for terminal 145. The process of allowing a mobile station which has an account with a first cellular system to travel into a second cellular system and receive services from that second system for incoming and outgoing calls is known as "roaming."

More specifically, as the cellular telephone terminal 145 "roams", or moves to another cellular system and tries to use its telecommunications services, as represented by the line 155 in FIG. 2, the visited MSC 135b notifies the home HLR 200 of the mobile station's presence in its area and requests information related to the station's account with that system via the communication link 130. If the request to provide telecommunications services is approved by the HLR 200, the MSC 135b provides the telecommunications service to the visiting cellular telephone terminal 145 as a roaming subscriber. The MSC 135b also receives the needed subscriber, user and terminal information from subscription records 105, user records 110 and terminal records 115 in the record information signal 120 from the HLR 200 and then stores all of this information at the visitor location register (VLR) 150. As may be seen in FIG. 2, the received information is then stored as subscription records 105', user records 110' and terminal records 115'. This reduces the need for the MSC 135b to communicate with the HLR 200 every time MSC 135b needs information from the home switch regarding telephone terminal 145. In an alternate embodiment, the received information could merely be stored in one register.

Figure 3:
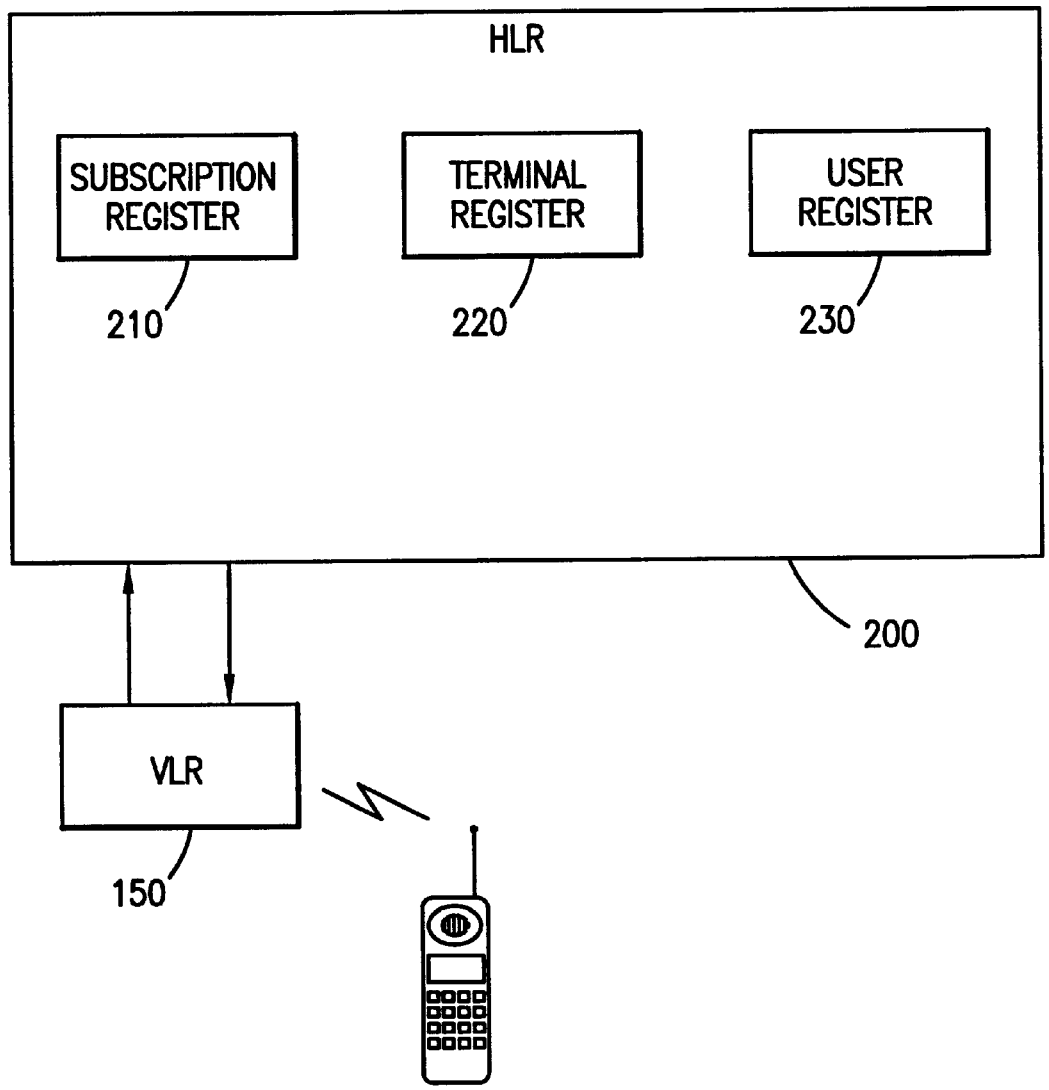
FIG. 3 is a block diagram representing a communication network according to one embodiment of the present invention.

FIG. 3 is a block diagram representing a communication network according to one embodiment of the present invention. The network of FIG. 3 includes three separate registers for storing, subscription, terminal and user information. Each register is separate and independent from the others. When the VLR 150 providing service to a terminal 145 of a roaming subscriber communicates with the HLR 200 of that subscriber, VLR 150 no longer retrieves data from a single record. Rather, in accordance with the present invention, the system of VLR 150 retrieves information about the subscriber from a subscription register 210, about the user terminal from a terminal register 220, and about the user from a user register 230. For simplicity, all three elements are shown in FIG. 3 as being assigned to the same home MSC/HLR. However, each of these three elements may also be found in a separate HLR.

In accordance with the invention, the present system enables a user assigned to one HLR to access and use a terminal or subscription assigned to and associated with a different party whose subscriber information is stored in a different HLR. Therefore, if a user wishes to use a subscriber terminal that is currently assigned to a different home MSC/HLR, then the user's home MSC/HLR must communicate with the terminal's MSC/HLR in order to provide the VLR 150 with all the necessary information to allow telecommunications services to be provided to the requesting (e.g., roaming) subscriber.

Figure 4:
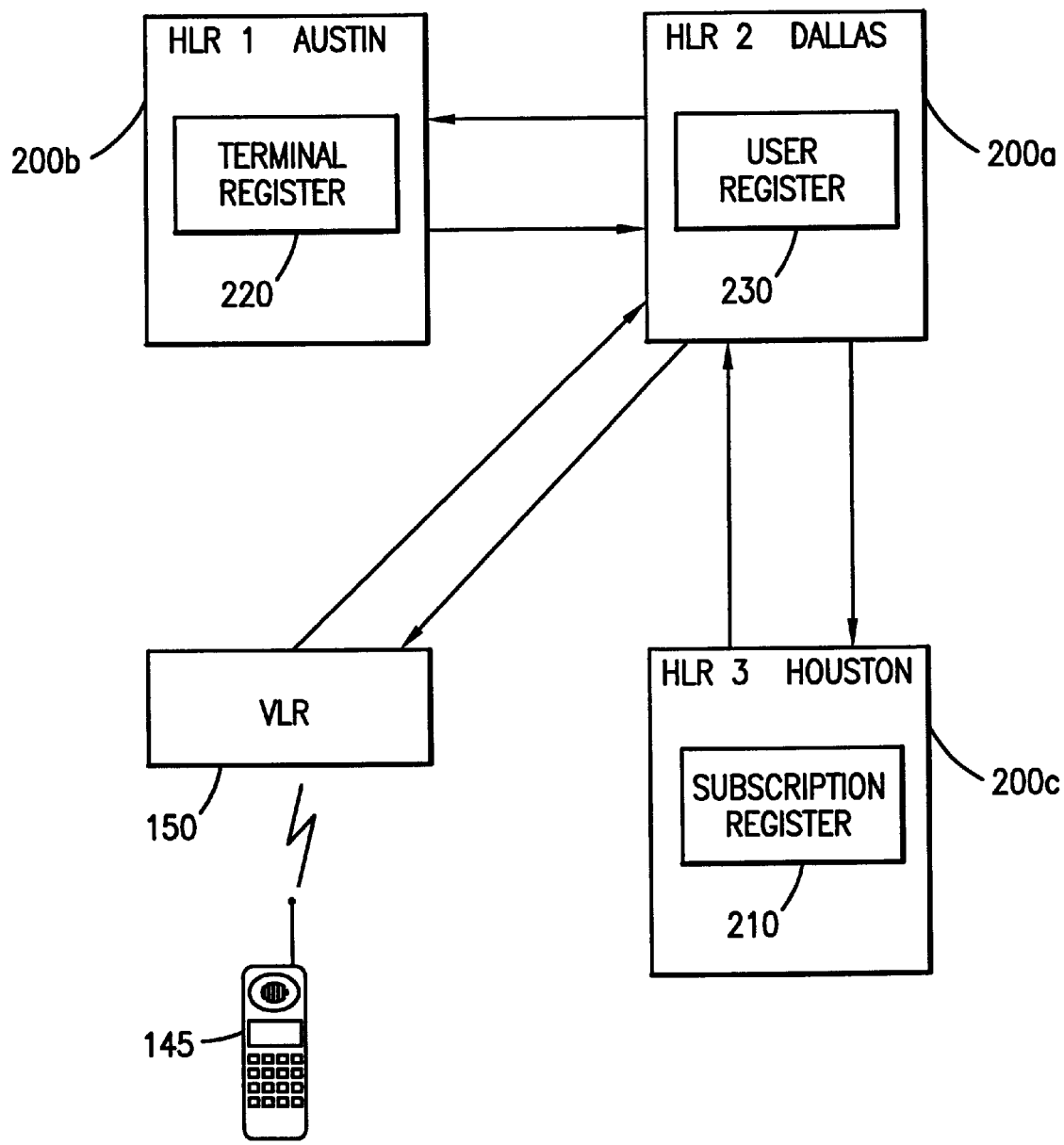
FIG. 4 is a block diagram illustrating a communication network according to a preferred embodiment of the invention.

FIG. 4 is a block diagram illustrating a communication network according to a preferred embodiment of the invention. Referring now to FIG. 4, the VLR 150 communicates with a number of different HLRs to obtain subscriber, user and terminal information. As shown, a terminal register 220, a user register 230 and a subscription register 210 are each located in a different HLR.

To better understand the operation of the invention, consider the network of FIG. 4. FIG. 4 shows a user within the coverage area of, for example, the Dallas HLR 200*a* using a terminal whose terminal record is stored within the Austin HLR 200*b*, while charging the calls to the user's company subscription assigned to the Houston HLR 200*c*. For such a case, the VLR 150 communicates with the HLR 200*a* containing the user register 230 to obtain user information. The HLR 200*a* in turn communicates with the HLR 200*b* containing the terminal register 220 to obtain terminal information, and with the HLR 200*c* containing the subscription register 210 to obtain subscription (billing) information. The HLR 200*a* transmits to the VLR 150 the information it receives from the HLRs 200*b* and 200*c*.

Figure 5:
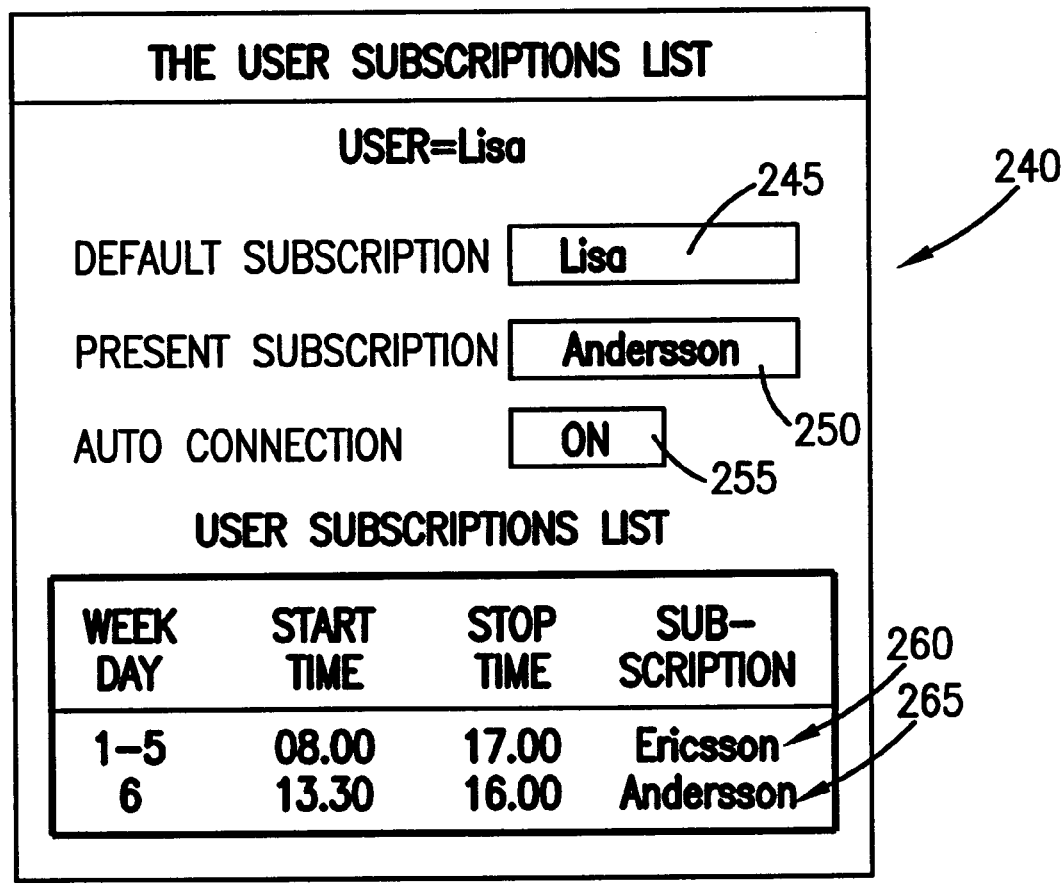
FIG. 5 is a block diagram illustrating an exemplary record within a user subscriptions list stored within HLR according to a preferred embodiment of the invention.

FIG. 5 is a block diagram illustrating an exemplary record within a user subscriptions list stored within an HLR, according to a preferred embodiment of the invention. Referring now to FIG. 5, the user subscriptions list record 240 is a part of the user record 230 formed within an HLR 200, as shown in FIG. 3. As shown, the user subscriptions list record 240 includes the three fields for defining a mode of operation and a table which defines a select schedule. The select schedule indicates what subscription is to be charged according to time and day.

Specifically, as shown in field 245, the default subscription is defined as Lisa. Accordingly, unless otherwise required by user selection or by the select schedule, the subscription account belonging to "Lisa" is charged for all calls. Field 250 indicates that the present subscription belongs to Andersson. Accordingly, any calls made at the present time will be charged to "Andersson's" subscription account. Field 255 indicates that the select schedule is currently being used (as opposed to "OFF") to determine the subscription to which charges should be recorded. Thus, the rows 260 and 265 define, in relation to the present time, whose subscription will be charged for any call made. Because field 250 indicates that the present subscription is defined for Andersson, it follows from the table that the present time must be between 1:30 and 4:00 p.m. on the sixth day of the week (assuming that there has been no manual override of the select schedule). While not explicitly shown in FIG. 5, it is understood that the present subscription field 250 will reflect that calls will be charged to Andersson either because the auto connection feature is "ON" and the select schedule specifies that the present subscription is "Andersson" or because the present subscription indicates "Andersson" according to user selection. One impact of the auto connection feature being "OFF", therefore, is that the select schedule merely does not alter the present subscription.

FIG. 6 is a block diagram illustrating an exemplary subscription record stored within an HLR according to a preferred embodiment of the invention. Referring now to FIG. 6, a subscription record 270 includes a list of the allowed users of the "Ericsson" subscription. As shown, subscription record 270 includes information pertaining to two allowed users, namely, Lisa and Adam. Referring to row 275, it may be seen that Lisa is an allowed user of the Ericsson subscription for days one through five from eight a.m. to five p.m. As may be seen from examining row 280, Adam is an allowed user at all times. While the subscription record 270 only lists the allowed users and the time during which they are allowed to use the "Ericsson" subscription, such a subscription record 270 may be used to track other parameters. For example, usage restriction may also be stored for each of or all of the users. To illustrate, if Lisa is only allowed to make local calls or to call toll-free numbers, then such a restriction could be placed in a column (not explicitly shown) in row 275.

Generally, the subscription record 270 is stored in the HLR to which the subscriber is assigned, by way of example, HLR 2 of FIG. 4. Additionally, only the actual owner of the subscription is allowed to modify the allowed user's list. While the subscription record 270 in FIG. 6 indicates that the allowed users are Lisa and Adam, it should be understood that the information defining the allowed users can be, for example, a specified ID code belonging to a person such as Lisa. It should also be understood that the block diagrams of FIGS. 5 and 6 represent data stored within a plurality of computer registers. The block diagrams of FIGS. 5 and 6 are shown herein to better illustrate the nature of the data stored within the registers of a computer system.

Figure 7:
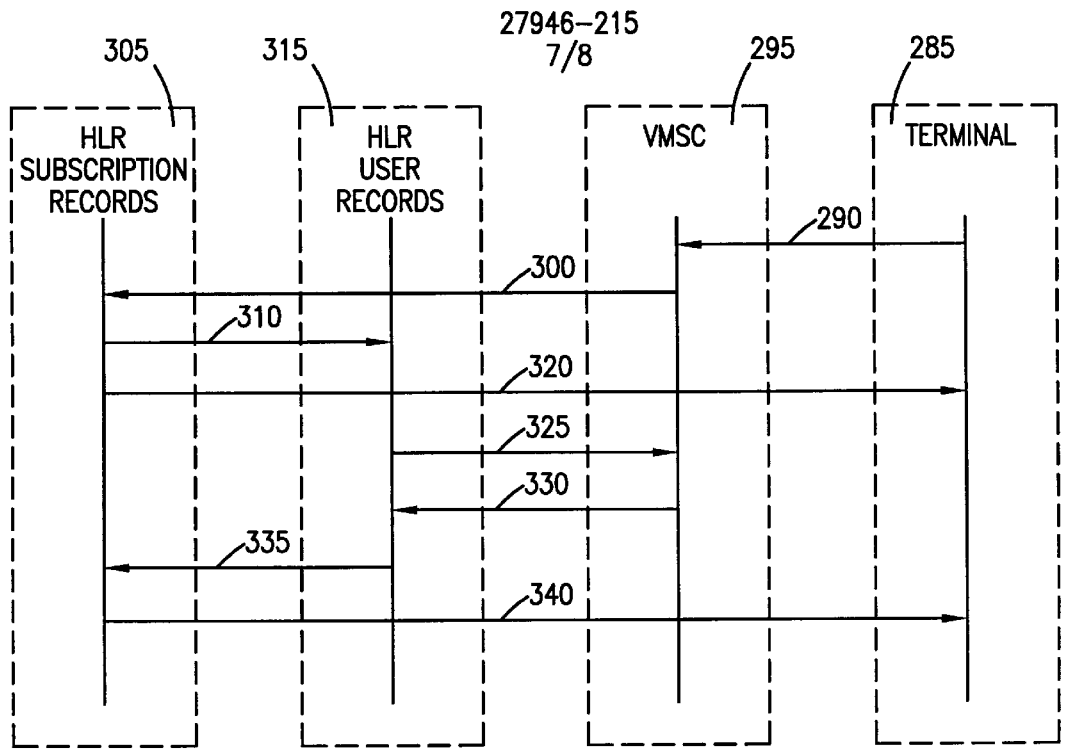
FIG. 7 is a signal-sequence diagram illustrating a sequence of signals for modifying the allowed users list in the HLR.

FIG. 7 is a signal-sequence diagram illustrating a sequence of signals modifying the allowed users list 270 of FIG. 6 in the HLR, according to a preferred embodiment of the invention. In general, a specified terminal associated with a user who is, in turn, associated with a subscription account must generate a signal for the HLR which stores a specified subscription record to modify the list of allowed users for the specified subscription account. Once the changes are made by the HLR and reflected within the user records and user profiles, the HLR generates a signal to the terminal to acknowledge the change in the list of allowed users. In the case where a user is registered in different MSCs for a plurality of different terminals, the HLR generates a signal to each of the MSCs. For the purposes of this signal-sequence diagram shown in FIG. 7, it is assumed that standard procedures to establish a communication link between a terminal and an HLR have already been followed and that a communication link has been established.

Referring now to FIG. 7, the terminal 285 transmits a feature code string signal 290 to the VMSC 295 to effect a change in the subscription records. The VMSC 295 translates the feature code string 290 received from the terminal 285 and transmits a feature request signal 300 to the HLR 305.

The feature request signal 300 includes the feature code, an identification of a user, a subscription ID (associated with a named person or organization), and usage parameters. The usage parameters define the days and time that a specified subscription account may be used by a user. Upon determining that the subscriber record which is to be modified, as defined in the feature request, is owned by the user registered on terminal 285 which generated the feature code string 290, the HLR 305 updates the allowed user's list to reflect the usage parameters received in the feature request signal 300.

For example, if the allowed user's list of FIG. 6 is modified for Lisa, then the user subscription list in HLR 315 must be updated so that the select schedule therein is consistent with the subscription records of the HLR 305 of FIG. 7. Thereafter, the HLR 305 updates the user records to be consistent with those in the allowed user's list for the particular user. To do so, HLR 305 generates and transmits an update signal 310 to the HLR 315. In the event that the change in the subscription and user records is generated by a system operator and not by the user, the user is informed by a short message service message, voice mail, etc. The HLR 315 also transmits an update profile signal 325 to the VMSC 295 so that the VMSC 295 may update its user profiles. Once the VMSC 295 updates its user profiles, it sends an acknowledge profile update signal 330 back to the HLR 315. The HLR 315 then sends an update profile acknowledgment signal 335 to the HLR 305. Once the HLR 305 receives the acknowledge profile update signal 335, it generates an acknowledge feature request signal 340 to the terminal 285.

As may be seen, each of two HLRs includes one of the two sets of records, the subscription records and the user records. However, the processing in each HLR is similar to the processing that would occur if the two sets of records were in the same location. Generally, the software processes that maintain the user records and subscription records are capable of exchanging information either by transmitting signals to each other, which signals either contain information or an address to information or instruction. One reason for developing such a signal architecture is that it is entirely possible that the user records and the subscription records for a particular user and subscriber combination, are maintained in separate HLRs or in one HLR.

Referring again to the acknowledge user records update signal 335, the acknowledge user records update signal 335 is actually generated from one HLR to another in the embodiment shown in FIG. 7. Thus, the apparatus and methods are implemented to support such signal transmissions independent of whether the processes for maintaining the user records and subscription records are in the same or different HLRs.

The update request signal 320 is transmitted to terminal 285 only if the change in the records was initiated by the user of the terminal instead of by the system operator. If the change is initiated by the system operator, a signal is generated to inform the user in the form of a voicemail message, a short message service message, or the like. One purpose of such messages is to inform the actual user that the change has been made to the subscription records list. Additionally, in the preferred embodiment, the user profile in the VLR is only updated if its present subscription information is changed. In such a case, the update profile signal 325 is acknowledged with an acknowledge profile update signal 330. If the present subscription information in the VLR is not changed, however, then according to the preferred embodiment, neither the update profile signal 325 nor the acknowledge profile update signal 330 is generated and transmitted from the VMSC to the HLR 315, and more particularly, to the processes for managing the user records in the HLR.

Figure 8:
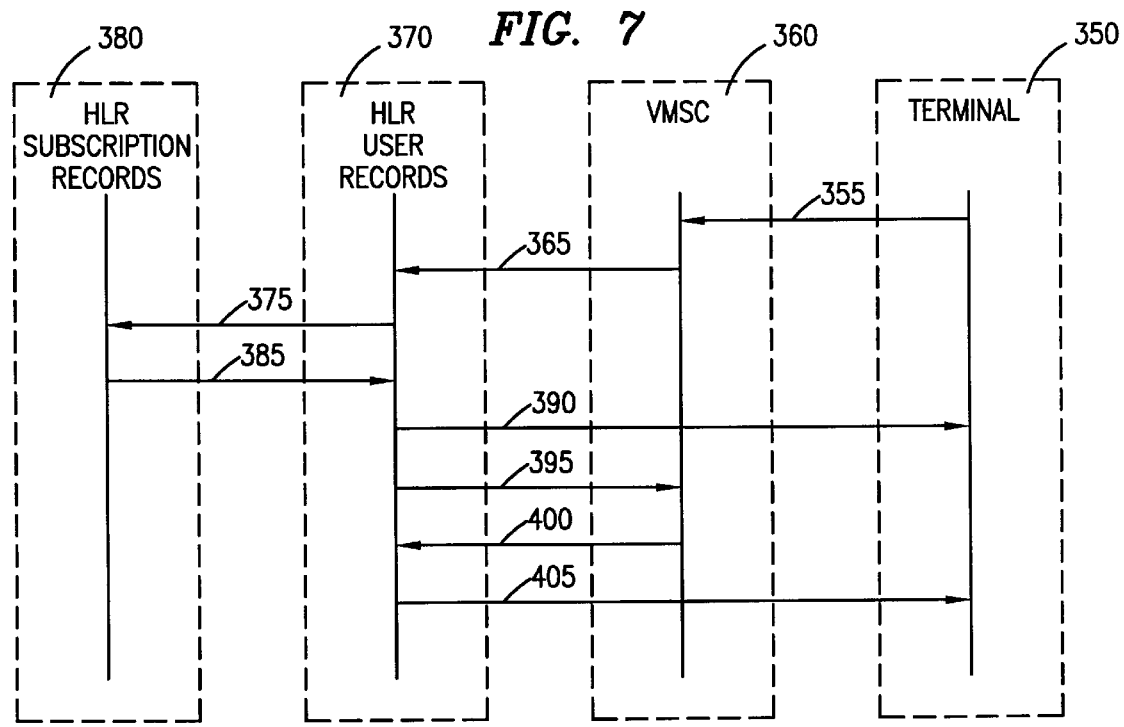
FIG. 8 is a signal-sequence diagram that illustrates a system and method for modifying the user records list to define new usage parameters.

FIG. 8 is a signal-sequence diagram that illustrates a system and method for modifying the user records list to define new usage parameters. Referring now to FIG. 8, terminal 350 transmits a feature code string signal 355 to VMSC 360. The feature code string signal 355 is, as before, a signal which reflects a specified operation or functionality that is being requested by terminal 350. VMSC 360, upon receiving feature code string signal 355, generates in response thereto a feature request signal 365 and transmits it to HLR 370. Feature request signal 365 includes, among other signals, a signal reflective of the requested feature code, a signal reflective of the user, a signal which defines the subscription owner, and a signal which defines the usage parameters for the given subscriber in relation to the user's terminal.

For the system shown in FIG. 8, HLR 370 is the HLR which maintains the user record for the user of terminal 350. Upon receiving the feature request signal 365, HLR 370 generates and transmits a permission request signal 375 to HLR 380. The permission request signal is reflective of those signals received within the feature request signal 365 which are necessary to determine whether the desired operation by terminal 350 is allowable. By way of example, HLR 380, which contains the subscription records, compares the requested usage parameters to verify such usage does not conflict with allowed usage as defined within the subscriber records. To illustrate, the subscription records for Ericsson, as shown in FIG. 6, indicate that its employee Lisa is allowed to use the Ericsson subscription on weekdays from 8:00 a.m. to 5:00 p.m. HLR 370 will acknowledge the feature request from terminal 350 so long as the usage parameters are within those defined within HLR 380. By way of example, the feature request includes a request to use the Ericsson subscription until 7:00 p.m. on a weekday or during a weekend, and such a feature request would not be acknowledged by HLR 370. As may be seen therefore, HLR receives the permission request signal 375 and generates and transmits to HLR 370 a permission acknowledge signal 385 if no conflicts are found.

If the modification to the user subscriptions list is initiated by a network operator, then the user may be informed in one of many forms including voicemail, a short message service message, or the equivalent form so as to inform the user that the register has been changed. HLR 370 also generates an update profile signal 395 and transmits the same to VMSC 360. VMSC 360 receives the update profile signal 395 and updates the user services profile in the VLR. Once the user services profile in the VLR is updated, VMSC 360 generates and transmits an acknowledge signal 400 to HLR 370. Once HLR 370 receives the acknowledge signal 400, it generates and transmits a feature request acknowledge signal 405 to terminal 350.

Figure 9:
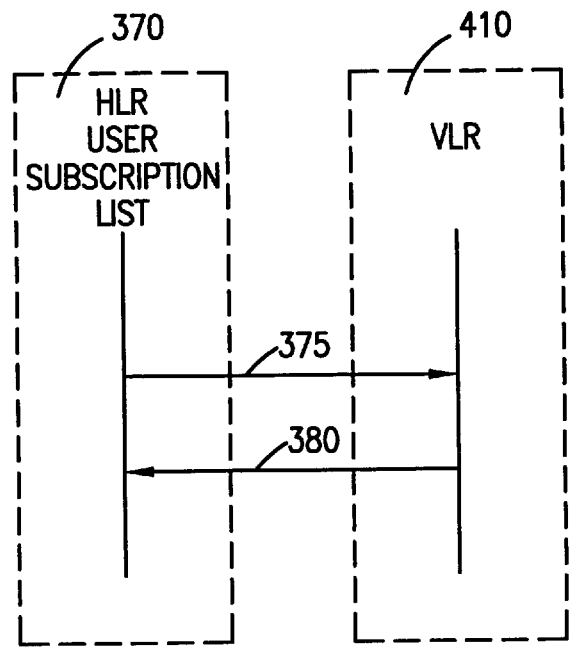
FIG. 9 is a signal-sequence diagram illustrating the automatic connection to or disconnection from a new subscription for a user.

FIG. 9 is a signal-sequence diagram illustrating the automatic connection to or disconnection from a new subscription for a user. Referring now to FIG. 9, there is shown an HLR 370 and a VLR 410. In general, HLR 370 updates the user profiles within VLR 410 whenever a profile changes for a specified user. By way of example, whenever subscription information is changed, or in other words, information relating to what party should be charged for a call, the HLR must update the user profiles within the VLR. Thus, according to the present invention, whenever the field defining the present subscriber according to a specified schedule is changed, the HLR must update the user profile in the VLR. By way of example, if a specified schedule reflects that Ericsson, Inc. is to be charged for all calls made between 8:00 a.m. and 5:00 p.m. on weekdays, then the present subscription will cycle from the default subscription which is the user subscription, to Ericsson and back according to the schedule.

More specifically, whenever the present subscription changes according to the select schedule, HLR 370 transmits an update profile signal 375 to VLR 410. Once VLR 410 has updated its profiles, it generates and transmits an update profile acknowledge signal 380 to HLR 370 to inform it that the profile has been updated. Alternatively, the acknowledge signal may also be transmitted to the HLR just to acknowledge receipt of the signal as or before the VLR 410 updates the user profiles.

In general, the MSC register is updated whenever the present subscription is changed in the HLR 370. One reason that the user subscription list in HLR 370 might change is, as discussed above, that a change in subscription is required according to a select schedule. As another example, however, operator selection may prompt a change in the user subscription list. For example, consider the scenario wherein the default subscription is the individual user while the present subscription is that of another (e.g., Ericsson). If the feature of having time activated subscription schedules is selected, the present subscription will be defined by the schedule. If the user de-selects the feature, the present subscription will no longer change according to schedule. If will change according to user or operator actions. For example, if the default subscription is the individual user while the present subscription is Ericsson, and then the feature of having time activated subscription schedules is de-selected, the present subscription will remain as Ericsson until it is changed by the user or operator.

Figure 10:
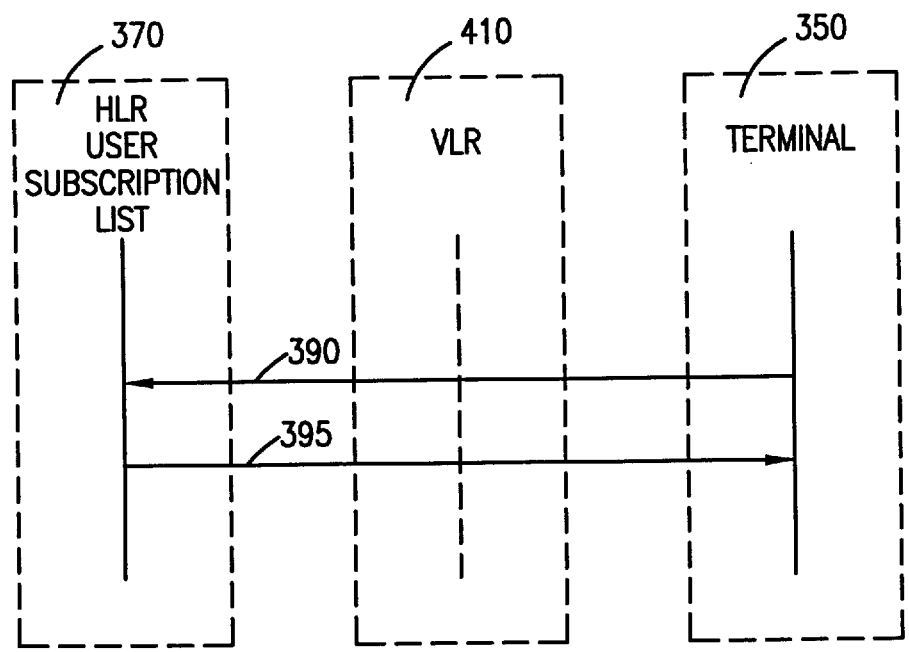
FIG. 10 is a signal-sequence diagram illustrating a sequence of signals for selecting the automatic registration feature according to a preferred embodiment of the invention.

Referring now to FIG. 10, a signal sequence diagram illustrating a sequence of signals for selecting the automatic registration feature according to a preferred embodiment of the invention. Terminal 350 transmits a feature request signal 390 to HLR 370, whenever the user depresses a button or sequence of buttons to disable the automatic registration feature. The feature request signal 390 includes a signal which defines the desired feature and which identifies the user. HLR 370 responds by modifying the users subscription list to reflect the user de-selection of the automatic registration feature. Once HLR 370 updates the users subscription list, it generates and transmits a feature request acknowledge signal 395 to terminal 350 to acknowledge the feature request.

Summarily, according to the teachings of the present invention, the concept of a cellular "subscriber" is divided into three different and separate entities: subscription, user and terminal. By such a division, allowing separate registers or storage means for each of the three entities, it is possible to connect several subscriptions to one user and several users to one subscription and several terminals to one user and several users to one terminal. The use of a select schedule allows a user to automatically have the calls charged to the appropriate subscription account.

Although a preferred embodiment of the method and apparatus of the present invention has been illustrated in the accompanying drawings and described in the foregoing detailed description, it will be understood that the invention is not limited to the embodiment disclosed, but is capable of numerous rearrangements, modifications and substitutions without departing from the spirit of the invention as set forth and defined by the following claims.

What is claimed is:

1. A method for updating a user record within a user records store of a communication system which includes a terminal, a switch, and a subscription records store, comprising the steps of:

transmitting a feature request signal from the switch to the user records store;

modifying a usage parameter within the user record which includes a schedule that defines a usage period for a plurality of subscription accounts for said user;

transmitting, from the terminal associated with the user record, a message for prompting the switch to transmit said feature request signal;

transmitting, from the user records store to the subscription records store, an update profile acknowledge signal; and determining whether a usage parameter within the update profile acknowledge signal is valid.

* * * * *